US007899055B2

(12) United States Patent
Mundra et al.

(10) Patent No.: US 7,899,055 B2
(45) Date of Patent: Mar. 1, 2011

(54) METHOD FOR ROUTE OPTIMIZATION WITH DUAL MOBILE IPV4 NODE IN IPV6-ONLY NETWORK

(75) Inventors: Kishore Mundra, Karnataka (IN); Lakshmi Praba Gurusamy, Karnataka (JP); Sameer Kumar, Karnataka (JP); Ranjitsinh Udaysinh Wable, Karnataka (JP)

(73) Assignee: Samsung Electronics Co., Ltd., Suwon-Si (KR)

( * ) Notice: Subject to any disclaimer, the term of this patent is extended or adjusted under 35 U.S.C. 154(b) by 1098 days.

(21) Appl. No.: 11/645,671

(22) Filed: Dec. 27, 2006

(65) Prior Publication Data

US 2007/0160065 A1 Jul. 12, 2007

(30) Foreign Application Priority Data

Dec. 29, 2005 (IN) .................. 1956/CHE/2005
Nov. 21, 2006 (KR) .................. 10-2006-0115454

(51) Int. Cl.
*H04L 12/28* (2006.01)
*H04L 12/56* (2006.01)
(52) U.S. Cl. ............... 370/392; 370/310; 370/238; 370/229; 370/248
(58) Field of Classification Search .......... 370/349, 370/310, 229, 230, 231, 241, 248, 351, 355, 370/356, 392
See application file for complete search history.

(56) References Cited

U.S. PATENT DOCUMENTS 7,328,281 B2 * 2/2008 Takeda et al. ............... 709/246

| 2004/0100951 | A1 * | 5/2004 | O'neill ................ 370/389 |
| 2004/0136382 | A1 | 7/2004 | Sundquist |
| 2004/0146042 | A1 * | 7/2004 | Ideshita et al. ............. 370/349 |
| 2004/0236937 | A1 * | 11/2004 | Perkins et al. ............. 713/150 |
| 2005/0144320 | A1 * | 6/2005 | Jagana et al. ............... 709/245 |
| 2005/0152298 | A1 * | 7/2005 | Thubert et al. ............. 370/312 |
| 2006/0198345 | A1 * | 9/2006 | Chen ................ 370/338 |
| 2006/0227971 | A1 * | 10/2006 | Haddad ................ 380/247 |
| 2006/0268820 | A1 * | 11/2006 | Mahkonen et al. .......... 370/349 |

OTHER PUBLICATIONS

Search Report issued in European Patent Application No. 06126986.6 on Apr. 11, 2007.
Nikander, Pekka et al. "Mobile IP version 6 (MIPv6) Route Optimization Security Design", 2003 IEEE $58^{TH}$ Orlando, FL, US, Oct. 6, 2006, pp. 2004-2008.
Larsson T et al.. "Use of MIPv6 in IPv4 and MIPv4 in IPV6 networks" Internet Engineering Task Force, Oct. 18, 2004.

* cited by examiner

*Primary Examiner*—Huy Phan
(74) *Attorney, Agent, or Firm*—Staas & Halsey LLP (57) ABSTRACT

A method for route optimization with a dual mobile IPv4 node in an IPv6-only network is provided. The method includes the operations of: receiving a visited IPv6 address from a router when the dual mobile node is connected to the IPv6-only network; updating a home agent with the IPv6 address; deregistering a binding update with a correspondent node via the home agent; updating the correspondent node with an IPv6 address; checking the reachability of packets directly to the correspondent node using its IPv6 address; the mobile node starting sending, to the CN, data packets tunneled in an IPv6 packet once the reachability is verified; and the correspondent node sending tunneled data packets directly to an IPv6 address of the mobile node.

15 Claims, 7 Drawing Sheets

METHOD FOR ROUTE OPTIMIZATION WITH DUAL MOBILE IPV4 NODE IN IPV6-ONLY NETWORK

CROSS-REFERENCE TO RELATED APPLICATIONS

This application claims the benefits of Indian Patent Application No. 1956/CHE/2005, filed on Dec. 29, 2005, in the Indian Intellectual Property Office, and Korean Patent Application No. 2006-115454, filed on Nov. 21, 2006, in the Korean Intellectual Property Office, the disclosures of which are incorporated herein by reference.

BACKGROUND OF THE INVENTION

1. Field of the Invention

Aspects of the present invention relate to wireless communication technology, and more particularly to a method for achieving route optimization when a dual IPv4 mobile node (MN) is connected with an IPv6-only network, wherein the route optimization allows packets to traverse a route shorter than a default route through a home agent (HA) using bidirectional tunneling, thus leading to better bandwidth utilization.

2. Description of the Related Art

An IP address is used to identify both a node and its location inside an IP network. Whenever a mobile node (MN) moves inside the network, its IP address must change as well. Many approaches have been proposed to support mobility in IP networks, sometimes designed to solve only specific problems. Handover latency, signaling, and packet loss are the major issues that need to be addressed. Using the existing technology, route optimization is not available and the communication between a MN and a correspondent node (CN) is possible only using bidirectional tunneling via a home agent (HA). The following subsections describe an existing communication path between a MN and a CN, when the MN is connected with an IPv6-only network. The various operations undergone in the existing technology can be stated as follows:

i) When an IPv4-capable dual mobile node (MN) enters an IPv6-only network, the dual MN obtains an IPv6 address.

ii) On receiving a router advertisement (RA), the dual MN realizes that the network is an IPv6-only network. The MN sends a Binding Update (BU) containing the IPv6 address of the IPv4-capable dual MN to its HA.

iii) On receiving the IPv6 address of the MN, a bidirectional tunnel is established between the HA and the dual MN in the IPv6-only network.

iv) All packets to and from the node go via the established bidirectional tunnel.

Since all of the packets that pass to and from a MN traverse a bidirectional tunnel between an HA and a MN, the HA is overloaded. If the HA does not support an IPv4-over-IPv6 tunneling, a mobile host cannot communicate with any CN.

SUMMARY OF THE INVENTION

Aspects of the present invention provides a method of achieving route optimization so that packets are directly delivered between a mobile node (MN) and a correspondent node (CN) while avoiding a bidirectional tunnel path via a home agent (HA), when a dual MN moves to an IPv6-only network.

Aspects of the present invention also provides a computer-readable recording medium that records a computer program for executing the method of achieving route optimization.

An aspect of the present invention is to achieve direct packet delivery (i.e., route optimization) between an MN and a CN that avoids a bidirectional tunnel path via an HA, when a dual MIPv4 node moves to an IPv6-only network. Route optimization is achieved by forming V6 tunneling by making use of the IPv6 capability of the CN or that of a router that is on link with the CN (which can act on behalf of the CN). IPv4 packets originating from the MN are encapsulated inside an IPv6 header and then tunneled. The encapsulated IPv4 packets are decapsulated by the CN or the router (on behalf of the CN) on reception.

Accordingly, according to an aspect of the present invention a method for route optimization with a dual mobile IPv4 node in an IPv6-only network includes: receiving a visited IPv6 address from a router when the dual mobile node is connected to the IPv6-only network; updating a home agent with the visited IPv6 address; deregistering a binding update with a correspondent node via the home agent; updating the correspondent node with the visited IPv6 address; checking the reachability of packets directly to the correspondent node using its IPv6 address; starting sending data packets tunneled in an IPv6 packet from the mobile node to the correspondent node once the reachability is verified; and sending tunneled data packets from the correspondent node directly to an IPv6 address of the mobile node.

According to another aspect of the present invention, updating the HA with the IPv6 address may include sending, from the mobile node to the home agent, a binding update packet encapsulated in an IPv6 header. The binding update packet may include a global visited IPv6 address of the mobile node in the field of an outer source, and an IPv6 address of the home agent in the field of an outer destination, and the inner packet may be a normal binding update packet. When receiving the binding update packet, the home agent may remove each binding cache existing for the mobile node and store an IPv6 address of the mobile node, which is one of required tunneling parameters. The mobile node may tunnel all the data packets destined to the correspondent node using an IPv6 address of the home agent. The home agent may de-tunnel the data packets destined to the correspondent node and tunnel the data packets from the correspondent node to the mobile node in an IPv6 packet.

According to another aspect of the present invention, the operation of deregistering the binding update with the correspondent node via the home agent may include deregistering a previous binding update of the mobile node with the correspondent node by sending, to the correspondent node via the home agent, a binding update packet encapsulated in an IPv6 packet. The binding update packet may include a global visited IPv6 address of the mobile node in the field of an outer source, an IPv6 address of the home agent in the field of an outer destination, an IPv4 home address of the mobile node in the field of an inner source, an IPv4 address of the correspondent node in the field of an inner destination, and a normal binding update as an inner packet. When receiving the packet, the correspondent node may remove its binding cache for the mobile node and start communicating with the mobile node using the home address of the mobile node.

According to another aspect of the present invention, updating the correspondent node with an IPv6 address may comprise sending a first packet including the IPv6 address of the mobile node to the correspondent node via the home agent and asking for an IPv6 address of the correspondent node. The correspondent node may store the IPv6 address of the mobile node included in the first packet in order to use the IPv6 address in data packet tunneling. The correspondent node may respond to the mobile node by sending, to the mobile node, a second packet including an IPv6 address of the correspondent node or an address of a router which is dual and is linked with the correspondent node.

According to another aspect of the present invention, checking the direct reachability to the correspondent node through its IPv6 address may include sending an IPv4-in-IPv6 packet destined to the correspondent node from the mobile node directly to the correspondent node. On receiving the packet, the correspondent node may send a response packet directly to the mobile node.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A mobile IPv4-only node can use a mobile IPv4 (MIPv4) to maintain connectivity while moving between IPv4 subnets. Similarly, a mobile IPv6-only node can use a mobile IPv6 (MIPv6) to maintain connectivity while moving between IPv6 subnets. One of the ways of migrating from IPv4 to IPv6 is to deploy a dual stack node running both the IPv4 and the IPv6. Such a node will be able to get both an IPv4 and an IPv6 address and thus can not only communicate with a current IPv4 Internet but also communicate with any IPv6 nodes and networks as they become available. A dual stack node can use a mobile IPv4 for its IPv4 stack and a mobile IPv6 for its IPv6 stack so that it can move between IPv4 and IPv6 subnets. Aspects of the present invention relate to a method for achieving route optimization so that when a dual MIPv4 mobile node (MN) is connected with a IPv6-only network, packets traverse a shorter route than a default route through a home agent (HA) using bidirectional tunneling, thus leading to better bandwidth utilization.

The MN, the CN and the HA may be dual capable. Instead of the CN, any dual router connected with the CN can act on behalf of the CN. Similarly, instead of the HA, any dual router supporting an IPv4-over-IPv6 tunnel can be present within the home administrative domain of the home network. In addition, the MN may have an IPv6 address of the HA.

Figure 1:
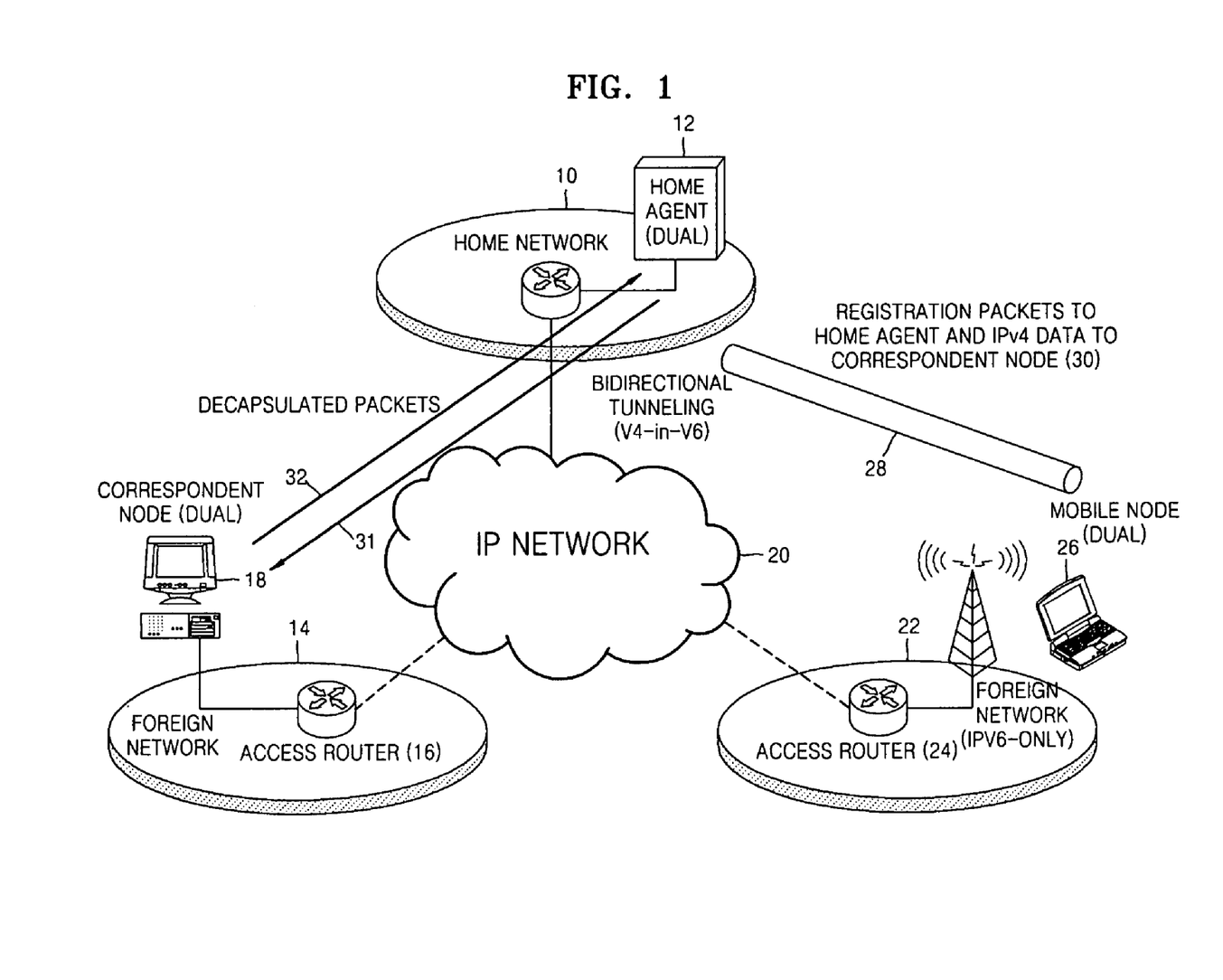
FIG. 1 illustrates packet exchanges between a mobile node (MN) and a home agent (HA) and between the MN and a correspondent node (CN) via the HA, when the MN moves to an IPv6-only network.

FIG. 1 shows packet exchanges between an MN 26 and a HA 12 and between the MN 26 and a correspondent node (CN) 18 via the HA 12, when the MN 26 moves to an IPv6-only network 22. FIG. 1 depicts handover of the MN 26, which is a dual capable node, from an IPv4 network (not shown) to the IPv6-only network 22. The mobile node may be any mobile device, such as a mobile telephone, a personal digital assistant (PDA), or a portable entertainment device such as an Apple™ iPod™. The correspondent node may be any computer system, such as a desktop, a laptop, a mobile device, a home entertainment system, or a network device such as a server. The home agent may be any device, such as a router, a server, or a personal computer.

The dual MN 26 receives an IPv6 address from an access router 24 upon entering the IPv6-only network 22. When receiving a router advertisement (RA) from the access router 24, the MN 26 realizes that the network 22 is an IPv6-only network. The MN 26 sends a binding update message containing the IPv6 address of the MN 26 to its own HA 12. Upon receipt of the IPv6 address of the MN 26, a bidirectional tunnel 28 is established between the HA 12 and the MN 26 in the IPv6-only network 22. All packets 30, including registration packets to the HA 12 and IPv4 data to be transmitted to the CN 18, are delivered via the bidirectional tunnel 28. The HA 12 decapsulates the IPv4 data 30 and forwards the decapsulated IPv data 31 to the CN 18. The HA 12 also receives IPv4 data packets 32 from the CN 18, encapsulates the IPv4 data packets 32, and forwards the encapsulated IPv4 data packets 32 to the MN 26 via the bidirectional tunnel 28.

Figure 2:
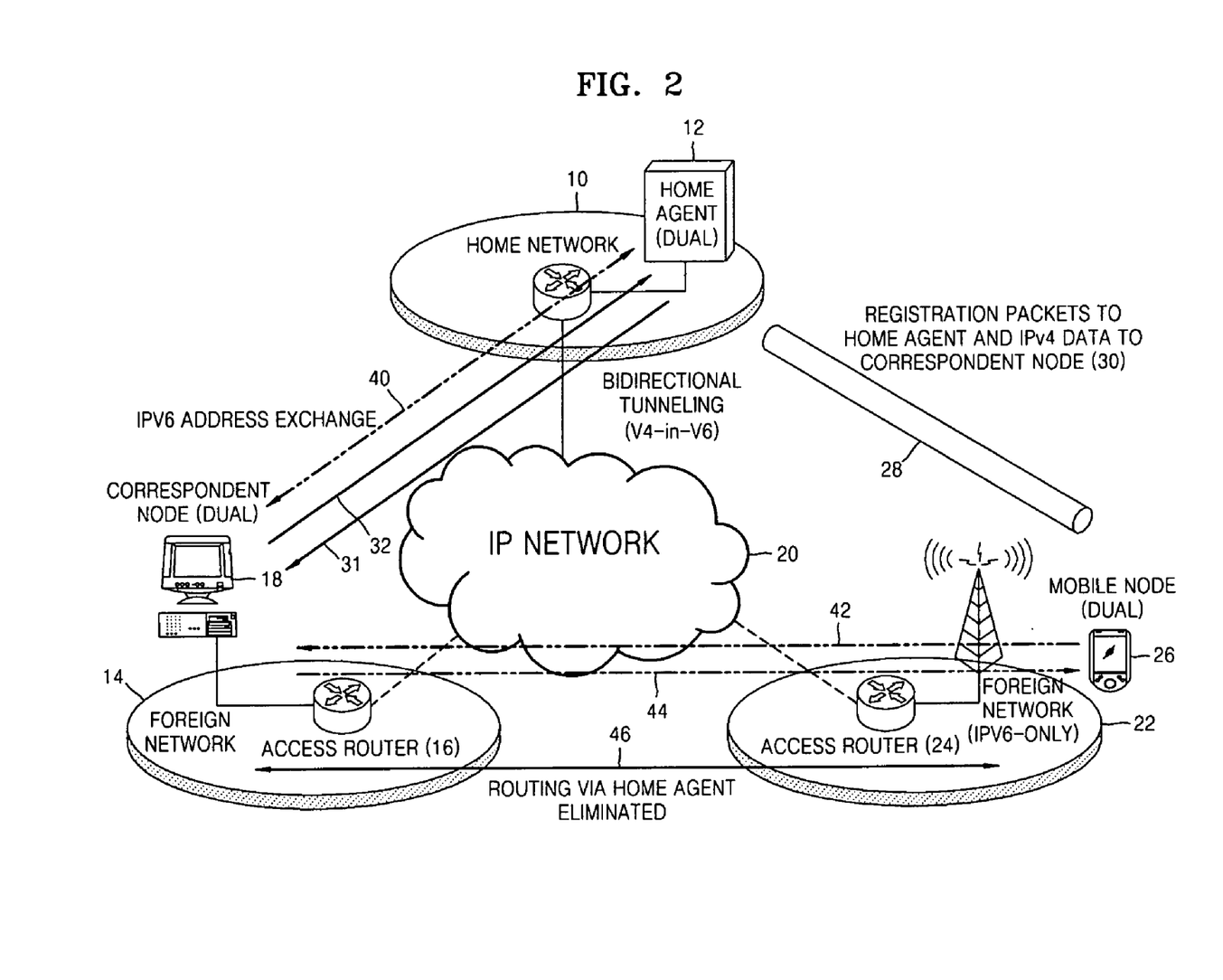
FIG. 2 illustrates message exchanges between the MN and the CN via the HA to achieve route optimization.

FIG. 2 shows new message exchanges between the MN 26 and the CN 18 via the HA 12 to achieve route optimization. An IPv6 address 40 is exchanged between the CN 18 and the MN 26 using the bidirectional tunnel 28 via the HA 12. Reachability test messages 42, a response message 44 corresponding to a response to the reachability test message 42 by the CN 18, and data packets 46 subsequent to the response message 44 are communicated directly between the MN 26 and the CN 18 using a IPv4-in-IPv6 tunnel between the MN 26 and the CN 18 without routing via the HA 12.

Once the MN 26 is connected to the IPv6-only network 22, it gets a new IPv6 address. Then, the MN 26 updates its HA 12 with the new IPv6 address. The HA 12 makes a binding entry for the MN 26 with the received IPv6 address and thereafter tunnels the packets received with the home address HOA of the MN 26 to the new IPv6 address of the MN 26. The MN 26 transmits its new IPv6 address to the CN 18 via the HA 12 in order to update the CN 18. The CN 18 updates its binding entry accordingly.

After updating the HA 12, the MN 26 sends out, via the HA 12, a new message to the CN 18 giving the MN's V6 address and requesting the IPv6 address of the CN 18 (if the CN 18 is dual). The packet of the new message is an IPv4-in-IPv6 tunnel packet. The HA 12 detunnels and forwards an inner packet to the CN 18. Then, if the CN 18 is dual, it sends its IPv6 address to the HA 12, as a response. The IPv6 address of the CN 18 is tunneled by the HA 12 and sent to the MN 26 to serve as a new IPv6 address.

Once the MN 26 knows the IPv6 address of the CN 18, it sends an address reachability test message 42 for direct delivery. When receiving the response message 44 from the CN 12, the MN 26 starts sending data packets 46 directly to the CN 18 using the IPv4-in-IPV6 tunnel.

Figure 3:
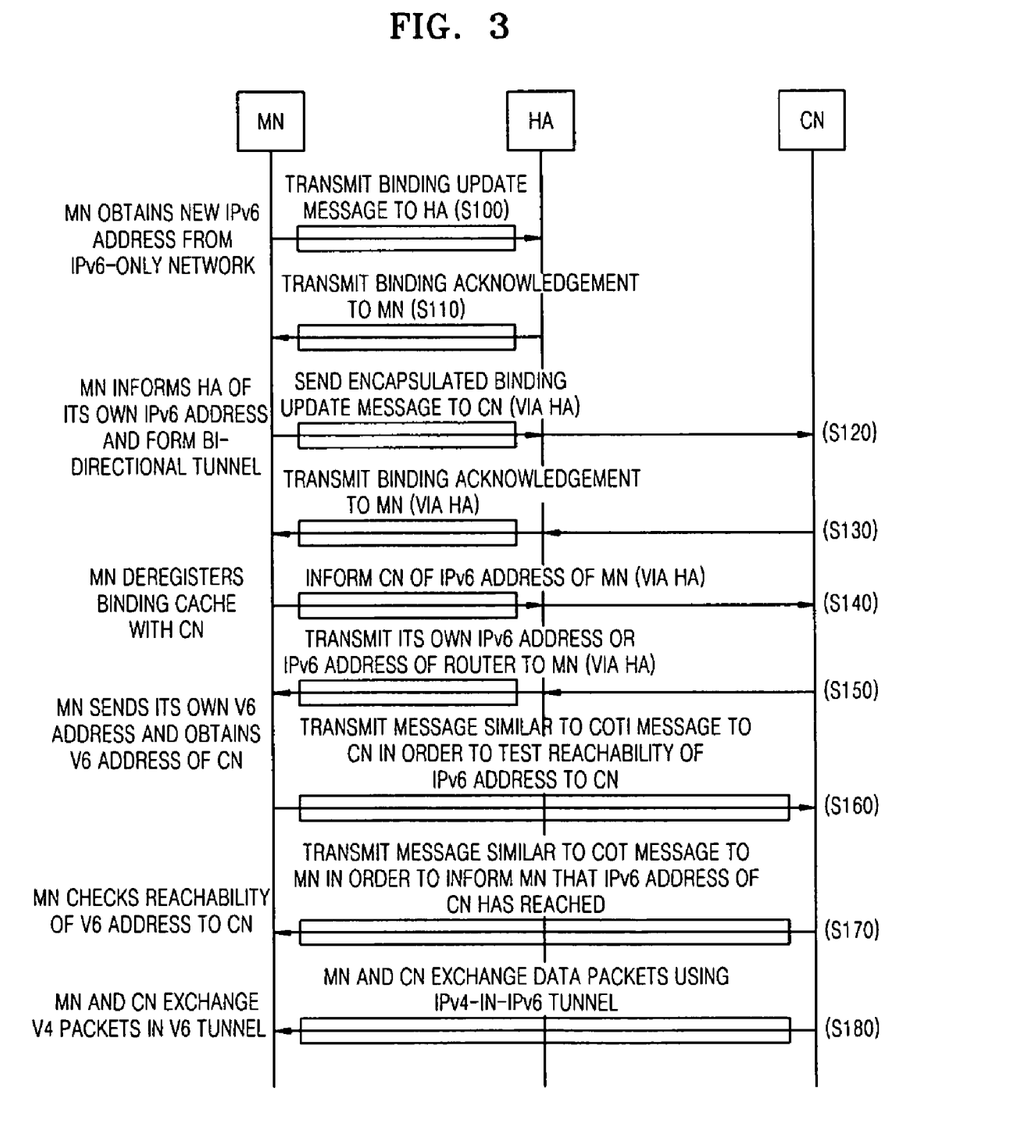
FIG. 3 illustrates a message flow between the MN, the HA, and the CN.

FIG. 3 shows a message flow between an MN, an HA, and a CN. It depicts tunneled and decapsulated packets in such a manner that they can be distinguished from each other. Lines covered with boxes denote IPv4-in-IPv6 tunneled packets. Lines not covered with boxes denote packets that are not tunneled, mainly plain packets between the CN and the HA.

FIG. 3 shows a message flow after the MN is connected to an external IPv6-only network and obtains a new IPv6 address. The first two packet exchanges update the HA with a movement of the MN. The MN transmits a binding update message to the HA in operation S100. The HA transmits a binding acknowledgement to the MN in operation S110.

The next two packet exchanges update the CN via the HA with a movement of the MN. In operation S120, the MN encapsulates a binding update message for the CN and sends the encapsulated binding update message to the HA; the HA decapsulates the binding update message and sends the decapsulated binding update message to the CN. In operation S130, the CN transmits a binding acknowledgement to the HA; the HA encapsulates the binding acknowledgement and sends the encapsulated binding acknowledgement to the MN.

The next two packet exchanges inform the CN of the IPv6 address of the MN and ask the CN to give its IPv6 address. In operation S140, the MN encapsulates and sends a message containing its own IPv6 address to the HA. The HA then decapsulates the message and sends the decapsulated message to the CN. In operation S150, the CN transmits a message containing its own IPv6 address, or the IPv6 address of a router, to the HA. The HA then encapsulates the message and transmits the encapsulated message to the MN.

The next two packet exchanges test reachability of the IPv6 address of the CN for direct delivery. The MN directly transmits a new message similar to a care-of test initiation (COTI) message to the CN in order to test the reachability of the IPv6 address of the CN in operation S160. When receiving the message, the CN transmits a new message similar to a care-of test (COT) message to the MN in order to inform the MN that the IPv6 address of the CN has been reached in operation S170.

A final packet exchange shows how data packets are transmitted between the MN and the CN. After testing the reachability between the MN and the CN, in operation S180 the data packets are delivered using an IPv4-in-IPv6 tunnel formed directly between the two nodes.

FIGS. 4A through 4D show sample formats of new messages when an MN moves to an IPv6-only network according to an embodiment of the present invention. These show the use of a new mobility header option. The new option is a Type-Length-Value option, carrying an IPv6 address to and from the MN and a CN. Four new mobility header options are defined, of which two are for exchanging an IPv6 address from the MN to the CN and from the CN to the MN, and the other two are for the reachability test of an IPv6 address from the MN to the CN and from the CN to the MN.

Figure 4A:
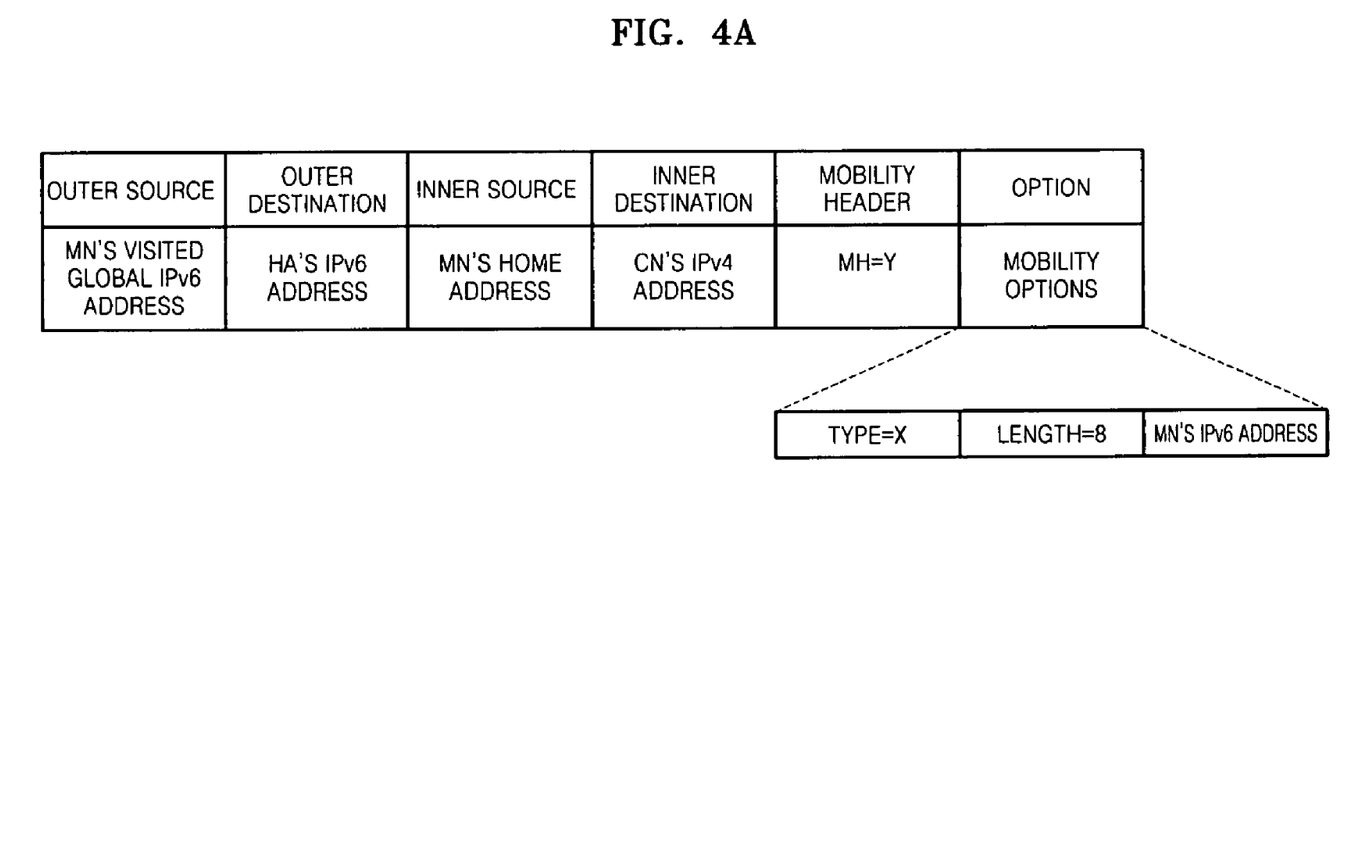
FIGS. 4A through 4D illustrate sample formats of new messages according to an embodiment of the present invention, when the MN moves to an IPv6-only network.

A packet format shown in FIG. 4A denotes a new mobility header to inform the CN of the IPv6 address of the MN. A packet format shown in FIG. 4B denotes a new mobility header for the MN to receive a reply from the CN with its IPv6 address. Two packet formats shown in FIGS. 4C and 4D denote new mobility headers to test reachability of the IPv6 address of the CN.

When the MN is connected to an IPv6-only network, all the traffic to and from the MN should traverse a bidirectional tunnel going to an HA. Thus, the HA is overloaded. According to aspects of the present invention, packets to and from the MN are allowed to go directly to the CN using the IPv4-in-IPv6 tunnel. To achieve this, the MN must be dual capable.

A method according to the present invention includes the following operations. In a first operation, when a dual-capable MN is connected to an IPv6-only network, it is configured with a visited IPv6 address (global) received from a router to which the MN is connected. In a second operation, the HA is updated with the IPv6 address of the MN. The MN first sends to the HA a binding update (BU) packet encapsulated in an IPv6 header. Then, the BU packet includes the MN's global visited IPv6 address in the field of an outer source and the HA's IPv6 address in the field of an outer destination. The inner packet included in the packet is typically a normal BU packet, though other types are possible as well. On receiving this packet, the HA removes a binding cache (if any) existing for this MN and stores any required tunneling parameters (such as a MN's IPv6 address). Next, the HA tunnels the packets to the CN and from the CN to the MN within an IPv6 packet; and the MN tunnels all the packets destined to the CN using the IPv6 address of the HA.

In a third operation, the binding with the CN is updated (via the HA). The MN deregisters its previous binding update with the CN by sending, to the CN (via the HA), a normal BU encapsulated in an IPv6 packet. The IPv6 packet includes an MN's visited IPv6 address (global) in the field of an outer source, an HA's IPv6 address in the field of an outer destination, an MN's IPv4 HoA in the field of an inner source, a CN's IPv4 address in the field of an inner destination, and a new BU. Other aspects of the present invention may use other fields. Thereafter, upon receiving this packet the CN removes its binding cache for this MN and starts communicating with the MN using the home address HOA of the MN.

Figure 4B:
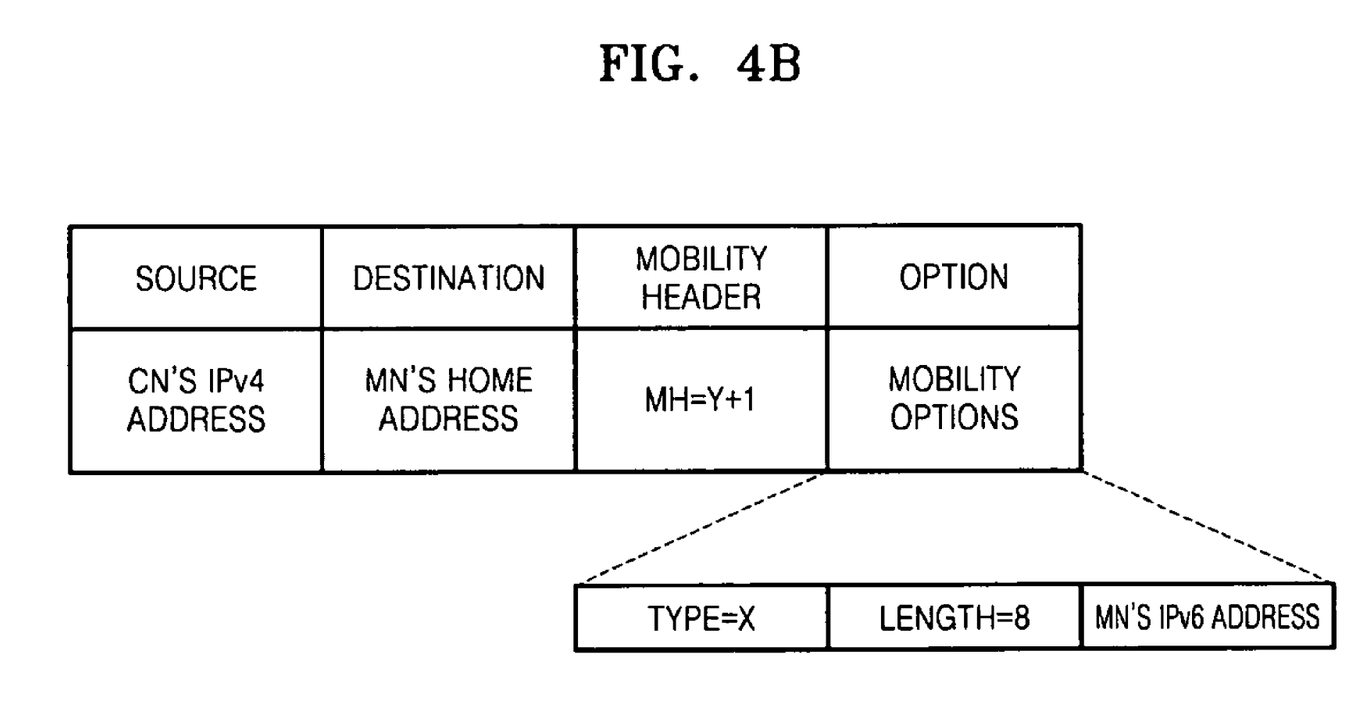

In a fourth operation, the CN is updated with an IPv6 address. The MN first sends to the CN (via the HA) a packet as shown in FIG. 4A including the IPv6 address of the MN asking for a CN's IPv6 address. Then, the CN stores the MN's IPv6 address to be used for data packet tunneling. Next, if the CN is dual capable, the CN replies back with its IPv6 address as shown in FIG. 4B. Otherwise, the CN replies back with the address of a router which is dual and is linked with the CN.

Figure 4C:
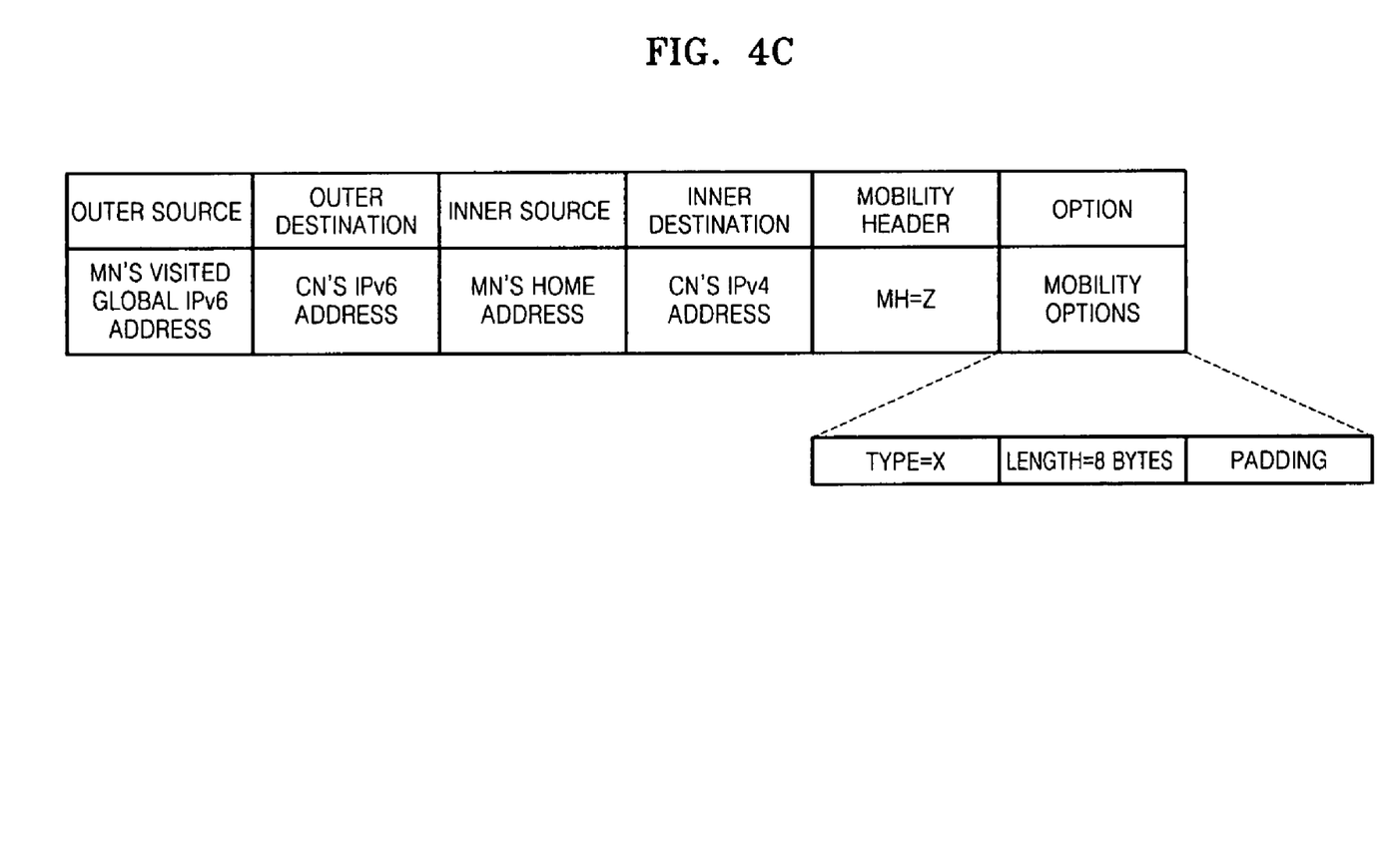
Figure 4D:
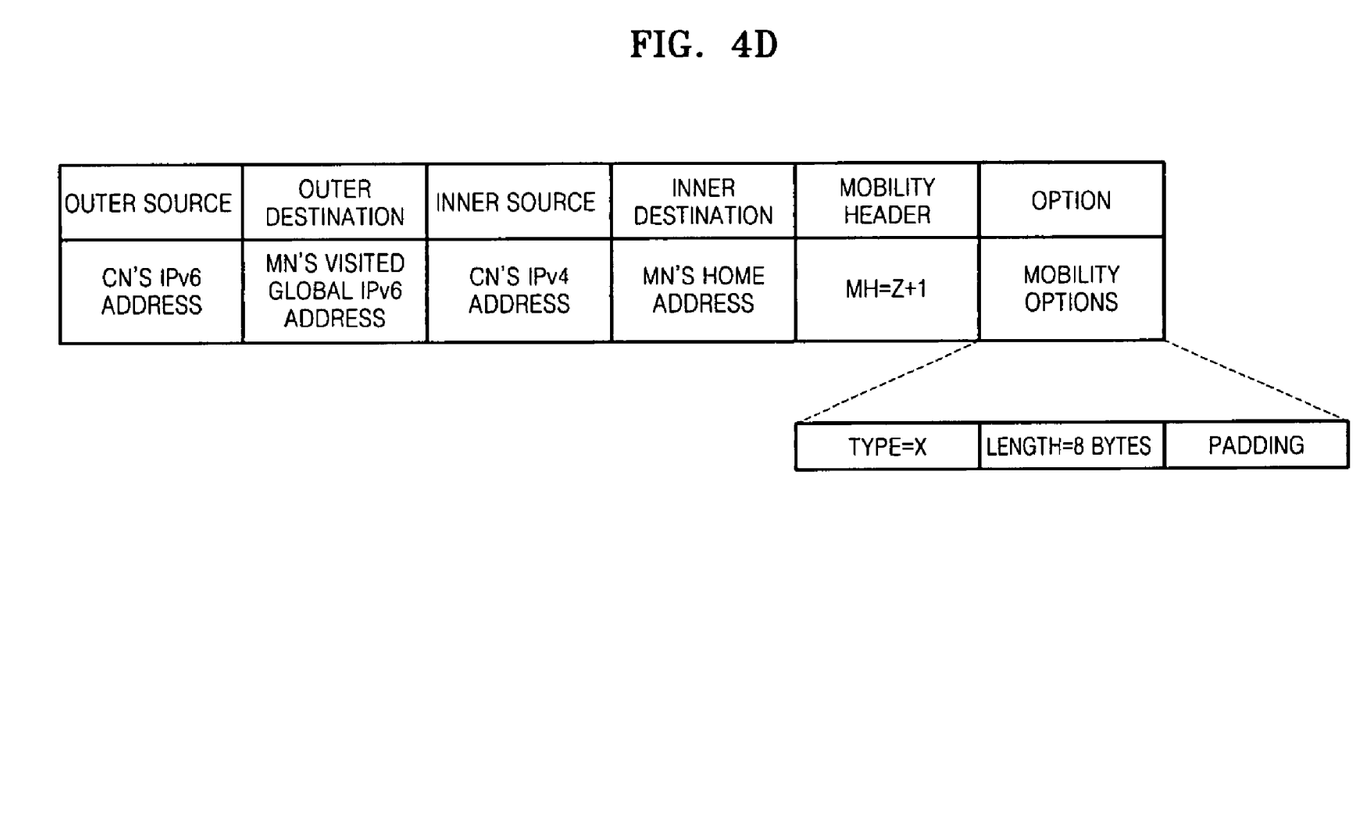

In a fifth operation, the reachability of packets of the MN to the CN through its IPv6 address (COTI-COT like) is checked. The MN first sends an IPv4-in-IPv6 packet as shown in FIG. 4C directly to the CN. Next, on receiving this packet, the CN sends a response packet as shown in FIG. 4D directly to the MN.

In a sixth operation, IPv4 data packets are communicated. Once the reachability is verified the MN starts sending to the CN the data packets tunneled in an IPv6 packet. Similarly, the CN sends the tunneled data packets directly to the MN's IPv6 address.

It will also be obvious to those skilled in the art that other control methods and apparatuses can be derived from the combinations of the various methods and apparatuses of the present invention as taught by the description and the accompanying drawings and these shall also be considered within the scope of the present invention. Further, a description of such combinations and variations is therefore omitted above. It should also be noted that the host for storing the applications may be, but is not limited to, a microchip, a microprocessor, a handheld communication device, a computer, a rendering device, or a multi-functional device.

Although the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as defined by the appended claims unless they depart therefrom.

The present invention can also be embodied as computer (i.e., any device having an information processing function)

readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

In a route optimization method according to the present invention, data packets are delivered between a mobile node and a correspondent node through an IPv4-in-IPv6 tunnel formed between the mobile node and the correspondent node, without passing through a home agent. Therefore, the delay of transmission can be reduced, the home agent can be prevented from being overloaded, the transmission efficiency of a network can be increased, and the usability of a bandwidth can be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for route optimization with a dual mobile IPv4 node in an IPv6-only network, the method comprising:
   receiving a visited IPv6 address from a first router when the dual mobile node is connected to the IPv6-only network;
   updating a home agent with the visited IPv6 address;
   deregistering a binding update with a correspondent node via the home agent;
   updating the correspondent node with the visited IPv6 address;
   checking a reachability of packets directly to the correspondent node using an IPv6 address of the correspondent node;
   starting sending data packets, from the mobile node to the correspondent node, tunneled in a first IPv6 packet once the reachability is verified; and
   sending tunneled data packets from the correspondent node directly to the visited IPv6 address of the mobile node,
   wherein the deregistering of the binding update with the correspondent node via the home agent comprises deregistering a previous binding update of the mobile node with the correspondent node by sending, to the correspondent node via the home agent, a binding update packet encapsulated in a second IPv6 packet.

2. The method as claimed in claim 1, wherein the updating of the home agent with the visited IPv6 address comprises sending, from the mobile node to the home agent, a binding update packet encapsulated in an IPv6 header.

3. The method as claimed in claim 2, wherein the binding update packet comprises:
   a global visited IPv6 address of the mobile node in the field of an outer source; and
   an IPv6 address of the home agent in the field of an outer destination;
   wherein the inner packet is a normal binding update packet.

4. The method as claimed in claim 3, further comprising:
   removing each binding cache existing for the mobile node upon receiving the binding update packet; and
   storing the visited IPv6 address of the mobile node, which is a required tunneling parameter.

5. The method as claimed in claim 1, wherein the binding update packet comprises:
   a global visited IPv6 address of the mobile node in the field of an outer source;
   an IPv6 address of the home agent in the field of an outer destination;
   an IPv4 home address of the mobile node in the field of an inner source;
   an IPv4 address of the correspondent node in the field of an inner destination; and
   a normal binding update as an inner packet.

6. The method as claimed in claim 5, further comprising:
   removing a binding cache for the mobile node upon receiving the binding update; and
   communicating with the mobile node using the IPv4 home address of the mobile node.

7. The method as claimed in claim 1, wherein the updating of the correspondent node with an IPv6 address comprises:
   sending a second packet including the IPv6 address of the mobile node to the correspondent node via the home agent; and
   asking for an IPv6 address of the correspondent node.

8. The method as claimed in claim 7, further comprising: storing the IPv6 address of the mobile node included in the second packet in order to use the IPv6 address in data packet tunneling.

9. The method as claimed in claim 8, further comprising: responding to the mobile node by sending, to the mobile node, a third packet including an IPv6 address of the correspondent node or an address of a second router which is dual and is linked with the correspondent node.

10. A non-transitory computer-readable recording medium which records a computer program for executing the method of claim 1.

11. A method for route optimization with a dual mobile IPv4 node in an IPv6-only network, the method comprising:
   receiving a visited IPv6 address from a first router when the dual mobile node is connected to the IPv6-only network;
   updating a home agent with the visited IPv6 address by sending, from the mobile node to the home agent, a binding update packet encapsulated in an IPv6 header, the binding update packet including a global visited IPv6 address of the mobile node in the field of an outer source and an IPv6 address of the home agent in the field of an outer destination, the inner packet being a normal binding update packet;
   deregistering a binding update with a correspondent node via the home agent;
   updating the correspondent node with the visited IPv6 address;
   checking a reachability of packets directly to the correspondent node using an IPv6 address of the correspondent node;
   starting sending data packets, from the mobile node to the correspondent node, tunneled in a first IPv6 packet once the reachability is verified;
   sending tunneled data packets from the correspondent node directly to the visited IPv6 address of the mobile node;
   removing each binding cache existing for the mobile node upon receiving the binding update packet;
   storing the visited IPv6 address of the mobile node, which is a required tunneling parameter;
   tunneling all the data packets destined to the correspondent node using the IPv6 address of the home agent; and de-tunneling the data packets destined to the correspondent node and tunneling packets from the correspondent node to the mobile node in a second IPv6 packet.

12. A non-transitory computer-readable recording medium which records a computer program for executing the method of claim 11.

13. A method for route optimization with a dual mobile IPv4 node in an IPv6-only network, the method comprising:
receiving a visited IPv6 address from a first router when the dual mobile node is connected to the IPv6-only network;
updating a home agent with the visited IPv6 address;
deregistering a binding update with a correspondent node via the home agent;
updating the correspondent node with the visited IPv6 address;
checking a reachability of packets directly to the correspondent node using an IPv6 address of the correspondent node;
starting sending data packets, from the mobile node to the correspondent node, tunneled in a first IPv6 packet once the reachability is verified; and
sending tunneled data packets from the correspondent node directly to the visited IPv6 address of the mobile node,
wherein the checking of the direct reachability to the correspondent node through the IPv6 address of the correspondent node comprises sending an IPv4-in-IPv6 packet destined to the correspondent node from the mobile node directly to the correspondent node.

14. The method as claimed in claim 13, further comprising sending a response packet directly to the mobile node upon receiving the IPv4-in-IPv6 packet.

15. A non-transitory computer-readable recording medium which records a computer program for executing the method of claim 13.

* * * * *

UNITED STATES PATENT AND TRADEMARK OFFICE
CERTIFICATE OF CORRECTION

| | | |
|---|---|---|
| PATENT NO. | : 7,899,055 B2 | Page 1 of 1 |
| APPLICATION NO. | : 11/645671 | |
| DATED | : March 1, 2011 | |
| INVENTOR(S) | : Kishore Mundra et al. | |

It is certified that error appears in the above-identified patent and that said Letters Patent is hereby corrected as shown below:

Title Page, Item (75) Inventors Column 1, Line 3 delete "(JP);" and insert -- (IN); --, therefor.

Title Page, Item (75) Inventors Column 1, Line 3 delete "(JP);" and insert -- (IN); --, therefor.

Title Page, Item (75) Inventors Column 1, Line 5 delete "(JP)" and insert -- (IN) --, therefor.

Signed and Sealed this
Thirty-first Day of May, 2011

David J. Kappos
*Director of the United States Patent and Trademark Office*